US012183885B2

(12) United States Patent
An et al.

(10) Patent No.: US 12,183,885 B2
(45) Date of Patent: Dec. 31, 2024

(54) ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Yu Ha An, Daejeon (KR); Hyun Seung Kim, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 666 days.

(21) Appl. No.: 17/425,129

(22) PCT Filed: Jan. 23, 2020

(86) PCT No.: PCT/KR2020/001175
§ 371 (c)(1),
(2) Date: Jul. 22, 2021

(87) PCT Pub. No.: WO2020/153791
PCT Pub. Date: Jul. 30, 2020

(65) Prior Publication Data
US 2022/0115701 A1    Apr. 14, 2022

(30) Foreign Application Priority Data

Jan. 25, 2019  (KR) .................. 10-2019-0010027
Jan. 22, 2020  (KR) .................. 10-2020-0008588

(51) Int. Cl.
*H01M 10/0567*    (2010.01)
*H01M 4/38*       (2006.01)
*H01M 4/587*      (2010.01)
*H01M 10/0525*    (2010.01)
*H01M 4/02*       (2006.01)

(52) U.S. Cl.
CPC .......... *H01M 10/0567* (2013.01); *H01M 10/0525* (2013.01); *H01M 2004/027* (2013.01); *H01M 4/386* (2013.01); *H01M 4/587* (2013.01); *H01M 2300/0025* (2013.01)

(58) Field of Classification Search
None
See application file for complete search history.

(56) References Cited

U.S. PATENT DOCUMENTS

| | | |
|---|---|---|
| 6,413,679 B1 | 7/2002 | Kuboki et al. |
| 2017/0331143 A1 | 11/2017 | Morinaka et al. |
| 2018/0034103 A1 | 2/2018 | Kubo et al. |
| 2018/0358655 A1 | 12/2018 | Kono et al. |
| 2018/0375158 A1 | 12/2018 | Morinaka et al. |
| 2020/0044287 A1 | 2/2020 | Kim et al. |
| 2020/0115401 A1 | 4/2020 | Takahashi et al. |
| 2020/0119400 A1 | 4/2020 | Kubo et al. |
| 2020/0136186 A1 | 4/2020 | Kubo et al. |
| 2020/0328474 A1 | 10/2020 | Itabashi et al. |
| 2021/0028493 A1 | 1/2021 | Morinaka et al. |

FOREIGN PATENT DOCUMENTS

| | | |
|---|---|---|
| CN | 101654229 A | 2/2010 |
| CN | 102617414 A | 8/2012 |
| CN | 103000942 A | 3/2013 |
| CN | 107004904 A | 8/2017 |
| CN | 107251310 A | 10/2017 |
| CN | 108475824 A | 8/2018 |
| CN | 108573816 A | 9/2018 |
| CN | 108808087 A | 11/2018 |
| EP | 3396771 A1 | 10/2018 |
| EP | 3518334 A1 | 7/2019 |
| EP | 3608328 A1 | 2/2020 |
| JP | 2005285382 A | 10/2005 |
| JP | 2017216040 A | 12/2017 |
| KR | 20170132239 A | 12/2017 |
| KR | 20190008100 A | 1/2019 |
| WO | 2016158986 A1 | 10/2016 |
| WO | 2018003992 A1 | 1/2018 |
| WO | 2018003993 A1 | 1/2018 |
| WO | 2018190304 A1 | 10/2018 |
| WO | 2019013501 A1 | 1/2019 |

OTHER PUBLICATIONS

Machine translation of WO2018/003992, Jan. 2018.*
Search report from International Application No. PCT/KR2020/001175, mailed Apr. 29, 2020.
Extended European Search Report and European Search Opinion for European Patent Application No. 20745547.8 dated Feb. 21, 2022, 9 pages.

* cited by examiner

*Primary Examiner* — Jonathan Crepeau
(74) *Attorney, Agent, or Firm* — Lerner David LLP

(57) ABSTRACT

An electrolyte for a lithium secondary battery and a lithium secondary battery including the same are disclosed herein. In some embodiments, an electrolyte includes a lithium salt, an organic solvent, and an additive, wherein the additive includes a compound represented by Formula 1 and a compound represented by Formula 2.

5 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2020/001175, filed on Jan. 23, 2020, which claims priority from Korean Patent Application Nos. 10-2019-0010027, filed on Jan. 25, 2019, and 10-2020-0008588, filed on Jan. 22, 2020, the disclosures of which are incorporated by reference herein.

TECHNICAL FIELD

The present invention relates to an electrolyte for a lithium secondary battery having excellent high-temperature characteristics and a lithium secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

A technology based on secondary batteries is the most suitable technology for various applications, wherein, since a secondary battery may be miniaturized, it is applicable to a personal IT device, and it is also applicable to a large device such as a power storage device.

Among these secondary battery technologies, lithium ion batteries, which are battery systems having the theoretically highest energy density, are in the spotlight.

The lithium ion battery is largely composed of a positive electrode formed of a transition metal oxide containing lithium, a negative electrode capable of storing lithium, an electrolyte solution that becomes a medium for transferring lithium ions, and a separator, and, among them, a significant amount of research on the electrolyte solution has been conducted while the electrolyte solution is known as a component that greatly affects stability and safety of the lithium ion battery.

The electrolyte solution causes a reduction decomposition reaction on an interface of the negative electrode during an activation process of the battery, and a reduced and decomposed product forms a solid electrolyte interphase (SEI) that transmits lithium ions, but suppresses additional decomposition of the electrolyte solution.

However, under high-temperature conditions, since a by-product, which is generated by a decomposition reaction of a salt included in the electrolyte solution, is activated and then rather decomposes the SEI formed on surfaces of the positive electrode and the negative electrode to reduce passivation ability of the SEI, this may cause the additional decomposition of the electrolyte solution and accompanying self-discharge.

Thus, there is an urgent need for research into an electrolyte which may form a robust SEI that is not damaged even by a side reaction caused by the decomposition product of the salt under high-temperature conditions.

PRIOR ART DOCUMENT

Korean Patent Application Laid-open Publication No. 10-2017-0132239

DISCLOSURE OF THE INVENTION

Technical Problem

An aspect of the present invention provides an electrolyte for a lithium secondary battery, in which high-temperature battery performance is improved, and a lithium secondary battery including the same.

Technical Solution

According to an aspect of the present invention, there is provided an electrolyte for a lithium secondary battery which includes: a lithium salt; an organic solvent; and an additive, wherein the additive includes a compound represented by Formula 1 and a compound represented by Formula 2.

[Formula 1]

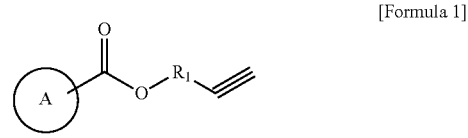

In Formula 1, A is a substituted or unsubstituted heteroaryl group having 3 to 6 carbon atoms which contains at least one nitrogen or a substituted or unsubstituted heterocyclic group having 3 to 6 carbon atoms which contains at least one nitrogen, and $R_1$ is a substituted or unsubstituted alkylene group having 1 to 3 carbon atoms.

[Formula 2]

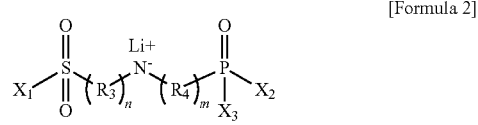

In Formula 2,
$R_3$ and $R_4$ are each independently selected from the group consisting of a linking group and an alkylene group having 1 to 3 carbon atoms,
$X_1$ to $X_3$ are each independently selected from the group consisting of a halogen, an alkyl group having 1 to 5 carbon atoms which is substituted or unsubstituted with a halogen, an alkenyl group having 2 to 5 carbon atoms which is substituted or unsubstituted with a halogen, an alkynyl group having 2 to 5 carbon atoms which is substituted or unsubstituted with a halogen, and an alkoxy group having 1 to 5 carbon atoms which is substituted or unsubstituted with a halogen, at least one of $X_1$ to $X_3$ includes a halogen, and n and m are each independently an integer of 0 or 1.

According to another aspect of the present invention, there is provided a lithium secondary battery including a positive electrode; a negative electrode; and the electrolyte for a lithium secondary battery, wherein the negative electrode includes a carbon-based negative electrode active material and a silicon-based negative electrode active material.

Advantageous Effects

Since an electrolyte for a lithium secondary battery according to the present invention may suppress a rapid increase in resistance under high-temperature conditions and may constantly maintain capacity, the electrolyte for a lithium secondary battery may improve high-temperature characteristics.

Since the electrolyte for a lithium secondary battery may form a robust solid electrolyte interphase (SEI) on a negative electrode, the negative electrode including a silicon-based active material with a large volume change in a high-temperature environment may be used, and thus, the present invention may provide a lithium secondary battery having excellent high-temperature characteristics as well as excellent capacity characteristics.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

<Electrolyte for Lithium Secondary Battery>

An electrolyte for a lithium secondary battery according to the present invention includes: a lithium salt; an organic solvent; and an additive, wherein the additive includes a compound represented by the following Formula 1 and a compound represented by the following Formula 2.

[Formula 1]

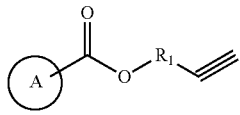

In Formula 1, A is a substituted or unsubstituted heteroaryl group having 3 to 6 carbon atoms which contains at least one nitrogen or a substituted or unsubstituted heterocyclic group having 3 to 6 carbon atoms which contains at least one nitrogen, and $R_1$ is a substituted or unsubstituted alkylene group having 1 to 3 carbon atoms.

[Formula 2]

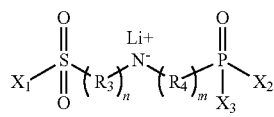

In Formula 2,
$R_3$ and $R_4$ are each independently selected from the group consisting of a linking group and an alkylene group having 1 to 3 carbon atoms,
$X_1$ to $X_3$ are each independently selected from the group consisting of a halogen, an alkyl group having 1 to 5 carbon atoms which is substituted or unsubstituted with a halogen, an alkenyl group having 2 to 5 carbon atoms which is substituted or unsubstituted with a halogen, an alkynyl group having 2 to 5 carbon atoms which is substituted or unsubstituted with a halogen, and an alkoxy group having 1 to 5 carbon atoms which is substituted or unsubstituted with a halogen, at least one of $X_1$ to $X_3$ includes a halogen, and n and m are each independently an integer of 0 or 1.

Hereinafter, each component of the electrolyte for a lithium secondary battery of the present invention will be described in more detail.

(1) Lithium Salt

First, a lithium salt will be described.

The lithium salt is used as a medium for transferring ions in a lithium secondary battery. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$.

In this case, it is desirable that the lithium salt is included in a concentration of 0.1 M to 3 M, preferably 0.8 M to 2.5 M, and more preferably 1 M to 1.5 M in the electrolyte for a lithium secondary battery. In a case in which the lithium salt is included within the above range, an increase in resistance in the battery may be prevented by preventing decomposition of a solid electrolyte interphase (SEI) formed on an electrode interface when the battery is operated at a high voltage while minimizing a by-product generated by the dissolution of the lithium salt in the electrolyte.

(2) Organic Solvent

Next, the organic solvent will be described.

In the present invention, the organic solvent is a solvent commonly used in a lithium secondary battery, wherein, for example, an ether compound, an ester compound (acetates and propionates), an amide compound, a linear carbonate or cyclic carbonate compound, or a nitrile compound may be used alone or in mixture of two or more thereof.

Among them, a carbonate-based electrolyte solution solvent containing cyclic carbonate, linear carbonate, or a carbonate compound, as a mixture thereof, may be typically used.

Specific examples of the cyclic carbonate compound may be a single compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more thereof. Also, as specific examples of the linear carbonate compound, a compound selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof may be typically used, but the present invention is not limited thereto.

In particular, since propylene carbonate and ethylene carbonate, as cyclic carbonates among the carbonate-based electrolyte solution solvents, are highly viscous organic solvents and have high dielectric constants, the propylene carbonate and ethylene carbonate may well dissociate the lithium salt in the electrolyte solution, and, thus, the propylene carbonate and ethylene carbonate may be preferably used. Since an electrolyte solution having high electrical conductivity may be prepared when the above cyclic carbonate is mixed with low viscosity, low dielectric constant linear carbonate, such as ethylmethyl carbonate, diethyl carbonate, or dimethyl carbonate, in an appropriate ratio, the propylene carbonate and ethylene carbonate may be more preferably used.

Furthermore, as the ester compound among the electrolyte solution solvents, a single compound selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof may be used, but the present invention is not limited thereto.

(3) Additive

Next, an additive will be described.

The additive includes a compound represented by the following Formula 1 and a compound represented by the following Formula 2.

[Formula 1]

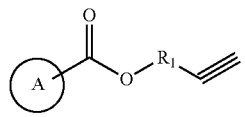

In Formula 1, A is a substituted or unsubstituted heteroaryl group having 3 to 6 carbon atoms which contains at least one nitrogen or a substituted or unsubstituted heterocyclic group having 3 to 6 carbon atoms which contains at least one nitrogen, and $R_1$ is a substituted or unsubstituted alkylene group having 1 to 3 carbon atoms.

[Formula 2]

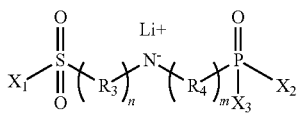

In Formula 2, $R_3$ and $R_4$ are each independently selected from the group consisting of a linking group and an alkylene group having 1 to 3 carbon atoms, $X_1$ to $X_3$ are each independently selected from the group consisting of a halogen, an alkyl group having 1 to 5 carbon atoms which is substituted or unsubstituted with a halogen, an alkenyl group having 2 to 5 carbon atoms which is substituted or unsubstituted with a halogen element, an alkynyl group having 2 to 5 carbon atoms which is substituted or unsubstituted with a halogen, and an alkoxy group having 1 to 5 carbon atoms which is substituted or unsubstituted with a halogen, at least one of $X_1$ to $X_3$ includes a halogen, and n and m are each independently an integer of 0 or 1.

Specifically, the compound represented by Formula 1 may be selected from the group consisting of compounds represented by Formulae 1a to 1d below.

[Formula 1a]

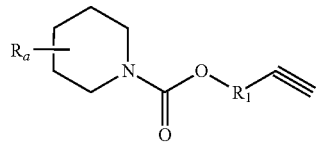

In Formula 1a, $R_1$ is a substituted or unsubstituted alkylene group having 1 to 3 carbon atoms, and $R_a$ is at least one selected from the group consisting of hydrogen, an alkyl group having 1 to 3 carbon atoms, and a cyano group.

[Formula 1b]

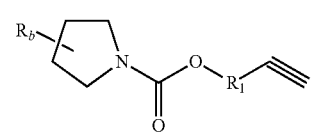

In Formula 1b, $R_1$ is a substituted or unsubstituted alkylene group having 1 to 3 carbon atoms, and $R_b$ is at least one selected from the group consisting of hydrogen, an alkyl group having 1 to 3 carbon atoms, and a cyano group.

[Formula 1c]

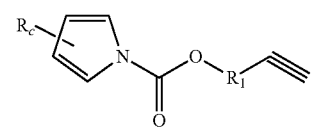

In Formula 1c, $R_1$ is a substituted or unsubstituted alkylene group having 1 to 3 carbon atoms, and $R_c$ is at least one selected from the group consisting of hydrogen, an alkyl group having 1 to 3 carbon atoms, and a cyano group.

[Formula 1d]

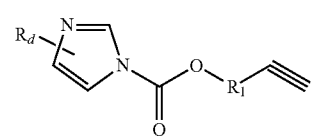

In Formula 1d, $R_1$ is a substituted or unsubstituted alkylene group having 1 to 3 carbon atoms, and $R_d$ is at least one selected from the group consisting of hydrogen, an alkyl group having 1 to 3 carbon atoms, and a cyano group.

More specifically, the compound represented by Formula 1 may be selected from the group consisting of compounds represented by Formulae 1e to 1h below.

[Formula 1e]

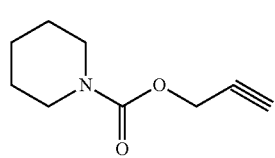

-continued

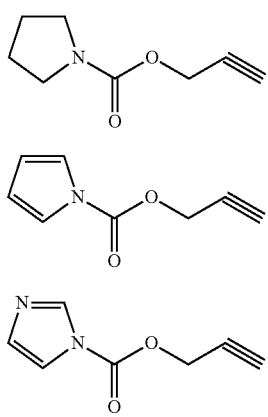

[Formula 1f]

[Formula 1g]

[Formula 1h]

The compound represented by Formula 1 may be included in an amount of 0.01 part by weight to 2 parts by weight, preferably 0.05 part by weight to 2 parts by weight, and more preferably 0.05 part by weight to 1 part by weight based on 100 parts by weight of the electrolyte for a lithium secondary battery. If the compound represented by Formula 1 is used, a stable film structure may be formed and a decomposition by-product of the salt in the battery may be scavenged, but components increasing battery resistance may be included in a film. Thus, in a case in which the compound represented by Formula 1 is included in an amount within the above range, the decomposition by-product of the salt in the battery may be effectively scavenged while minimizing the increase in the resistance in the battery, and a negative electrode film may be stably formed.

In a case in which the compound according to Formula 1 is used, the occurrence of a side reaction under high-temperature conditions may be suppressed by scavenging HF and $PF_5$ which are generated when the salt is decomposed at high temperature. Also, since decomposition of the electrolyte at high temperature is suppressed by forming a stable film on a surface of a negative electrode, an amount of gas generated due to a decomposition reaction may be reduced to improve high-temperature safety of the battery.

However, if the compound according to Formula 1 is used, since a component with large resistance is included in the film, initial resistance of the battery may be increased. Furthermore, since the compound according to Formula 1 may not form a stable film on a surface of a positive electrode in comparison to the negative electrode, it is difficult to use the compound according to Formula 1 alone.

Thus, the inventors of the present invention devised an electrolyte using a compound according to Formula 2, which may suppress an increase in the initial resistance and may form a stable film on the surface of the positive electrode, together in addition to the compound according to Formula 1.

Specifically, the compound represented by Formula 2 may include a compound represented by Formulae 2a below.

[Formula 2a]

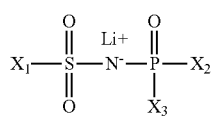

In Formula 2a, $X_1$ to $X_3$ are each independently selected from the group consisting of a halogen, an alkyl group having 1 to 5 carbon atoms which is substituted or unsubstituted with a halogen, an alkenyl group having 2 to 5 carbon atoms which is substituted or unsubstituted with a halogen, an alkynyl group having 1 to 5 carbon atoms which is substituted or unsubstituted with a halogen, and an alkoxy group having 1 to 5 carbon atoms which is substituted or unsubstituted with a halogen, and at least one of $X_1$ to $X_3$ may include a halogen.

As a more specific example, the compound represented by Formula 2 may be selected from the group consisting of compounds represented by Formulae 2b to 2h below.

[Formula 2b]

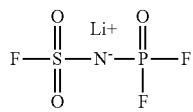

[Formula 2c]

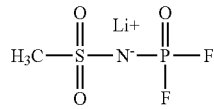

[Formula 2d]

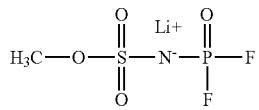

[Formula 2e]

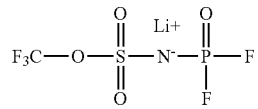

[Formula 2f]

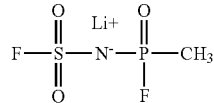

[Formula 2g]

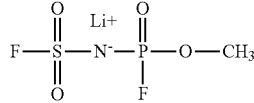

[Formula 2h]

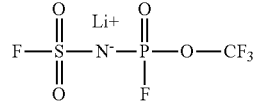

The compound represented by Formula 1 and the compound represented by Formula 2 may be included in a weight ratio of 2:0.5 to 2:23, but may be preferably included in a weight ratio of 2:1 to 2:20, more particularly 2:1 to 2:18, and more preferably 2:1 to 2:16 in the electrolyte for a lithium secondary battery in order to prevent an increase in the resistance after high-temperature charge and discharge. In a case in which each of the compounds is included in an amount within the above range, since a stable film may be formed on the surface of the positive electrode while suppressing a phenomenon of increasing the initial resistance by the compound represented by Formula 1, capacity characteristics and resistance characteristics of the battery may be improved.

(4) Additional Additives

The electrolyte for a lithium secondary battery according to an embodiment of the present invention may further include other additional additives which may form a stable film on the surfaces of the negative electrode and the positive electrode while not significantly increasing the initial resistance in addition to the effect from the additive including the compounds represented by Formulae 1 and 2, or which may act as a complementary agent for suppressing the decomposition of the solvent in the electrolyte for a lithium secondary battery and improving mobility of lithium ions.

These other additional additives are not particularly limited as long as these are additives capable of forming a stable film on the surfaces of the positive electrode and the negative electrode. As a representative example, the other additional additive may include at least one selected from the group consisting of a phosphate-based or phosphite-based compound, a sulfate-based compound, a sultone-based compound, a lithium salt-based compound, a halogenated benzene compound, a sulfite-based compound, a sulfone-based compound, a halogen-substituted carbonate-based compound, a nitrile-based compound, and a borate-based compound, and may preferably further include at least one selected from the group consisting of a phosphate-based compound, a sulfate-based compound, a sultone-based compound, a lithium salt-based compound, and a halogenated benzene compound.

The phosphate-based or phosphite-based compound is a component for assisting the formation of the SEI by being electrochemically decomposed on the surfaces of the positive electrode and the negative electrode, wherein an effect of improving long-term cycle life characteristics of the secondary battery may be achieved by the phosphate-based or phosphite-based compound. As a representative example, the phosphate-based compound may include at least one compound selected from the group consisting of lithium difluoro(bisoxalato)phosphate, lithium difluorophosphate, tetramethyl trimethylsilyl phosphate (TMSPa), trimethylsilyl phosphite (TMSPi), tris(2,2,2-trifluoroethyl) phosphate (TFEPa), and tris(trifluoroethyl) phosphite (TFEPi).

The sulfate-based compound may include ethylene sulfate (Esa), trimethylene sulfate (TMS), or methyl trimethylene sulfate (MTMS).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$.

The halogenated benzene compound may include fluorinated benzene and 1-4-dimethoxy-2-fluorobenzene. With respect to the halogenated benzene compound, gas generation at high temperatures may be suppressed by forming the SEI on the surfaces of the positive/negative electrodes, and an overcharge reaction may be suppressed by forming an insulation layer when the battery is overcharged.

The sulfite-based compound may include at least one compound selected from the group consisting of ethylene sulfite, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite.

The sulfone-based compound may include at least one compound selected from the group consisting of divinyl sulfone, dimethyl sulfone, diethyl sulfone, methylethyl sulfone, and methylvinyl sulfone.

The borate-based compound may include lithium oxalyldifluoroborate.

The halogen-substituted carbonate-based compound may include fluoroethylene carbonate (FEC).

Also, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

As the other additives, the above-listed compounds may be included alone or in a mixture of two or more thereof, and the additive including the compound represented by Formula 1 and the compound represented by Formula 2 and the other additives may be included in an amount of 20 parts by weight or less, for example, 10 parts by weight or less based on 100 parts by weight of the electrolyte for a lithium secondary battery. If the amount of the additive and the other additives is greater than 20 parts by weight, a side reaction in the electrolyte may occur excessively during charge and discharge of the battery, and, since the additives, which were not sufficiently decomposed at high temperatures, may be present in the form of an unreacted material or precipitates to increase the initial resistance of the lithium secondary battery, life characteristics of the battery may be degraded.

<Lithium Secondary Battery>

Next, a lithium secondary battery according to the present invention will be described.

The lithium secondary battery according to an embodiment of the present invention includes a positive electrode, a negative electrode, and the electrolyte for a lithium secondary battery. In this case, since the electrolyte for a lithium secondary battery is the same as described above, a detailed description thereof will be omitted.

(1) Positive Electrode

The positive electrode may be prepared by coating a positive electrode collector with a positive electrode active material slurry including a positive electrode active material, a binder for an electrode, a conductive agent for an electrode, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In this case, the positive electrode collector may have fine surface roughness to improve bonding strength with the positive electrode active material, and the positive electrode collector may be used in various shapes such as a film, a sheet, a foil, a net, a porous body, a foam body, a non-woven fabric body, and the like.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium-nickel-manganese-based oxide (e.g., LiNi$_{1-Y1}$Mn$_{Y1}$O$_2$ (where 0<Y1<1), LiMn$_{2-Z1}$Ni$_{Z}$O$_4$ (where 0<Z1<2), etc.), lithium-nickel-cobalt-based oxide (e.g., LiNi$_{1-Y2}$Co$_{Y2}$O$_2$ (where 0<Y2<1), lithium-manganese-cobalt-based oxide (e.g., LiCo$_{1-Y3}$Mn$_{Y3}$O$_2$ (where 0<Y3<1), LiMn$_{2-Z2}$Co$_{Z2}$O$_4$ (where 0<Z2<2), etc.), lithium-nickel-manganese-cobalt-based oxide (e.g., Li(Ni$_{p1}$Co$_{q1}$Mn$_{r1}$)O$_2$ (where 0<p1<1, 0<q1<1, 0<r1<1, and p1+q1+r1=1) or Li(Ni$_{p2}$Co$_{q2}$Mn$_{r2}$)O$_4$ (where 0<p2<2, 0<q2<2, 0<r2<2, and p2+q2+r2=2), etc.), or lithium-nickel-cobalt-transition metal (M) oxide (e.g., Li(Ni$_{p3}$Co$_{q3}$Mn$_{r3}$M$_{S1}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein 0<p3<1, 0<q3<1, 0<r3<1, 0<S1<1, and p3+q3+r3+S1=1), etc.), and any one thereof or a compound of two or more thereof may be included.

Among these materials, in terms of the improvement of capacity characteristics and stability of the battery, the lithium composite metal oxide may include LiCoO$_2$, LiMnO$_2$, LiNiO$_2$, lithium nickel manganese cobalt oxide (e.g., Li(Ni$_{0.6}$Mn$_{0.2}$Co$_{0.2}$)O$_2$, Li(Ni$_{0.5}$Mn$_{0.3}$Co$_{0.2}$)O$_2$, or Li(Ni$_{0.5}$Mn$_{0.1}$Co$_{0.1}$)O$_2$), or lithium nickel cobalt aluminum oxide (e.g., LiNi$_{0.5}$Co$_{0.15}$Al$_{0.05}$O$_2$, etc.), and, in consideration of a significant improvement due to the control of type and content ratio of elements constituting the lithium composite metal oxide, the lithium composite metal oxide may include Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$)O$_2$, or Li(Ni$_{0.5}$Mn$_{0.1}$Co$_{0.1}$)O$_2$, and any one thereof or a mixture of two or more thereof may be used.

The binder for an electrode is a component that assists in the binding between the positive electrode active material and the electrode conductive agent and in the binding with the current collector. Specifically, the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer, a sulfonated ethylene-propylene-diene terpolymer, a styrene-butadiene rubber, a styrene-butadiene rubber-carboxymethylcellulose (SBR-CMC), a fluoro rubber, various copolymers, and the like.

The conductive agent for an electrode is a component for further improving the conductivity of the positive electrode active material. Any electrode conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent is included.

(2) Negative Electrode

The negative electrode, for example, may be prepared by coating a negative electrode collector with a negative electrode active material slurry including a negative electrode active material, a binder for an electrode, a conductive agent for an electrode, and a solvent.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Various negative electrode active materials used in the art, for example, a carbon-based negative electrode active material, a silicon-based negative electrode active material, or a metal alloy may be used as the negative electrode active material.

According to an embodiment, the negative electrode active material may include a carbon-based negative electrode active material and a silicon-based negative electrode active material.

As the carbon-based negative electrode active material, various carbon-based negative electrode active materials used in the art, for example, a graphite-based material such as natural graphite, artificial graphite, and Kish graphite; high-temperature sintered carbon such as pyrolytic carbon, mesophase pitch based carbon fiber, meso-carbon microbeads, mesophase pitches, and petroleum or coal tar pitch derived cokes; soft carbon, and hard carbon may be used. A shape of the carbon-based negative electrode active material is not particularly limited, but a material with various shapes, such as an irregular shape, a planar shape, a flaky shape, a spherical shape, or a fibrous shape, may be used.

Preferably, the carbon-based negative electrode active material may include at least one of natural graphite and artificial graphite. More preferably, the carbon-based negative electrode active material may include natural graphite and artificial graphite. In a case in which the natural graphite and the artificial graphite are used together, since adhesion with the current collector is increased, exfoliation of the active material may be suppressed.

The silicon-based negative electrode active material may include at least one selected from the group consisting of metallic silicon (Si), silicon oxide (SiO$_x$, where 0<x≤2), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubidium (db), Cr, Mo, tungsten (W), seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and a combination thereof.

A mixing ratio of the silicon-based negative electrode active material the carbon-based negative electrode active material may be in a range of 1:99 to 50:50, for example, 5:95 to 30:70, as a weight ratio. In a case in which the mixing ratio of the silicon-based negative electrode active material to the carbon-based negative electrode active material satisfies the above range, excellent cycle performance may be secured by suppressing volume expansion of the silicon-based negative electrode active material while improving capacity characteristics.

In a case in which the silicon-based negative electrode active material is used as the negative electrode active material, there is a limitation in that the silicon-based negative electrode active material is cracked and finely powdered due to a large volume change accompanied with charge and discharge of lithium. Particularly, there was a limitation in that capacity was rapidly reduced and cycle life was shortened as charge and discharge cycles were carried out at high temperatures.

However, in a case in which the electrolyte for a lithium secondary battery according to the present invention is used together, since the SEI may be stably modified, the above-described limitations may be improved, and thus, the degradation of battery performance may be minimized even under high-temperature conditions while the capacity characteristics are excellent.

Since the binder for an electrode, the electrode conductive agent, and the solvent are the same as described above, detailed descriptions thereof will be omitted.

(3) Separator

Also, the lithium secondary battery of the present invention may further include a separator which may be disposed between the positive electrode and the negative electrode.

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a polyolefin-based porous polymer film coated with inorganic particles (e.g.: $Al_2O_3$) or a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1

(1) Preparation of Electrolyte for Lithium Secondary Battery

After $LiPF_6$ and $LIN(FSO_2)_2$ (lithium bis(fluorosulfonyl) imide, LiFSI) were dissolved in an organic solvent, in which ethylene carbonate:ethyl methyl carbonate were mixed in a volume ratio of 3:7, such that concentrations of the $LiPF_6$ and the LiFSI were 0.7 M and 0.3 M, respectively, an electrolyte for a lithium secondary battery was prepared by adding 0.5 part by weight of the compound represented by Formula 1h, 1 part by weight of the compound represented by Formula 2b, and 1 part by weight of ethylene sulfonate, 0.5 part by weight of 1,3-propane sultone, 0.2 part by weight of $LiBF_4$, and 6 parts by weight of fluorobenzene, as other additives, based on 100 parts by weight of the electrolyte for a lithium secondary battery.

(2) lithium Secondary Battery Preparation

A positive electrode active material ($Li(Ni_{0.5}Co_{0.1}Mn_{0.1})O_2$; NCM811), carbon black as a conductive agent, and polyvinylidene fluoride (PVDF), as a binder, were mixed in a weight ratio of 97.5:1:1.5 and then added to N-methyl-2-pyrrolidone (NMP), as a solvent, to prepare a positive electrode active material slurry with a solid content of 50 wt %. An about 12 μm thick aluminum (Al) thin film, as a positive electrode collector, was coated with the positive electrode active material slurry, dried, and roll-pressed to prepare a positive electrode.

A negative electrode active material (graphite (AGP8):SiO=95:5 weight ratio), a styrene-butadiene rubber-carboxymethylcellulose (SBR-CMC) as a binder, and carbon black, as a conductive agent, were mixed in a weight ratio of 95:3.5:1.5 in distilled water, as a solvent, to prepare a negative electrode active material slurry (solid content: 60 wt %). A 6 μm thick negative electrode collector (Cu thin film) was coated with the negative electrode active material slurry, dried, and roll-pressed to prepare a negative electrode.

The positive electrode, the negative electrode, and a separator formed of polypropylene/polyethylene/polypropylene (PP/PE/PP) were stacked in the order of the positive electrode/separator/negative electrode, and, after the stacked structure was disposed in a pouch-type battery case, the electrolyte was injected to prepare a lithium secondary battery.

2. Example 2

An electrolyte and a lithium secondary battery were prepared in the same manner as in Example 1 except that 0.5 part by weight of the compound represented by Formula 1h and 0.5 part by weight of the compound represented by Formula 2b were added when the electrolyte for a lithium secondary battery was prepared.

3. Example 3

An electrolyte and a lithium secondary battery were prepared in the same manner as in Example 1 except that 0.5 part by weight of the compound represented by Formula 1h and 4 parts by weight of the compound represented by Formula 2b were added when the electrolyte for a lithium secondary battery was prepared.

4. Example 4

An electrolyte and a lithium secondary battery were prepared in the same manner as in Example 1 except that 0.5 part by weight of the compound represented by Formula 1h and 5.5 parts by weight of the compound represented by Formula 2b were added when the electrolyte for a lithium secondary battery was prepared.

5. Example 5

An electrolyte and a lithium secondary battery were prepared in the same manner as in Example 1 except that 0.5 part by weight of the compound represented by Formula 1h and 0.2 part by weight of the compound represented by Formula 2b were added when the electrolyte for a lithium secondary battery was prepared.

COMPARATIVE EXAMPLES

1. Comparative Example 1

An electrolyte and a lithium secondary battery were prepared in the same manner as in Example 1 except that 0.5 part by weight of the compound represented by Formula 1h was not added when the electrolyte was prepared.

2. Comparative Example 2

An electrolyte and a lithium secondary battery were prepared in the same manner as in Example 1 except that 1 part by weight of the compound represented by Formula 2b was not added when the electrolyte was prepared.

3. Comparative Example 3

An electrolyte and a lithium secondary battery were prepared in the same manner as in Example 1 except that both 0.5 part by weight of the compound represented by Formula 1h and 1 part by weight of the compound represented by Formula 2b were not added when the electrolyte was prepared.

4. Comparative Example 4

An electrolyte and a lithium secondary battery were prepared in the same manner as in Example 1 except that 1 part by weight of the compound represented by Formula 1h was added and the compound represented by Formula 2b was not added when the electrolyte was prepared.

EXPERIMENTAL EXAMPLES

1. Experimental Example 1: High-Temperature (45° C.) Capacity Retention Measurement After formation was performed on each of the lithium secondary batteries prepared in Examples 1 to 5 and Comparative Examples 1 to 4 at a current of 200 mA (0.1 C rate), gas in the battery was removed (degassing process).

Thereafter, CC/CV charging at 660 mA (0.33 C, 0.05 C cut-off) to 4.2 V and CC discharging at 660 mA (0.33 C) to 2.5 V were performed 200 times at a high temperature (45° C.), respectively, discharge capacity when one cycle was performed and discharge capacity after 200 cycles were measured (measured using PNE-0506 charge/discharge equipment (manufacturer: PNE SOLUTION Co., Ltd., 5 V, 6 A)), and the discharge capacity when one cycle was performed was set as initial capacity. Thereafter, the 200$^{th}$ discharge capacity and the initial capacity (100%) were compared to calculate capacity retention, and the results thereof are presented in Table 1.

TABLE 1

|  | Capacity retention (%) after high-temperature (45° C.) charge and discharge |
| --- | --- |
| Example 1 | 89.75 |
| Example 2 | 89.23 |
| Example 3 | 89.39 |
| Example 4 | 89.26 |
| Example 5 | 89.30 |
| Comparative Example 1 | 88.97 |
| Comparative Example 2 | 88.17 |
| Comparative Example 3 | 88.20 |
| Comparative Example 4 | 89.13 |

Referring to Table 1, it may be confirmed that high-temperature capacity retentions of the lithium secondary batteries prepared in Examples 1 to 5 were higher than those of the lithium secondary batteries prepared in Comparative Examples 1 to 4.

2. Experimental Example 2: High-Temperature (45° C.) Resistance Increase Rate Measurement After formation was performed on each of the lithium secondary batteries prepared in Examples 1 to 5 and Comparative Examples 1 to 4 at a current of 200 mA (0.1 C rate), gas in the battery was removed (degassing process). After each lithium secondary battery having gas removed therefrom was moved to charge/discharge equipment at room temperature (25° C.), each lithium secondary battery was charged at 0.33 C rate to 4.2 V under a constant current/constant voltage condition, cut-off charged at 0.05 C, and discharged at 0.33 C to 2.5 V. A SOC (state of charge) was set to 50% based on discharge capacity after the above charge/discharge were performed three times, respectively. In this case, direct current internal resistance was measured by a voltage drop obtained when each of the lithium secondary batteries was subjected to a discharge pulse at 5 A (2.5 C) for 10 seconds (measured using PNE-0506 charge/discharge equipment (manufacturer: PNE SOLUTION Co., Ltd., 5 V, 6 A)), and the resistance in this case was set as initial resistance.

Thereafter, after CC/CV charging at 660 mA (0.33 C, 0.05 C cut-off) to 4.2 V and CC discharging at 660 mA (0.33 C) to 2.5 V were performed 200 times at a high temperature (45° C.), respectively, each lithium secondary battery was moved to charge/discharge equipment at room temperature (25° C.), a SOC (state of charge) was set to 50%, and direct current internal resistance was then measured by a voltage drop obtained when each lithium secondary battery was subjected to a discharge pulse at 5 A (2.5 C) for 10 seconds (measured using PNE-0506 charge/discharge equipment (manufacturer: PNE SOLUTION Co., Ltd., 5 V, 6 A)). This was compared with the initial resistance (0%) to calculate a resistance increase rate (%), and the results thereof are presented in Table 2.

TABLE 2

| | Resistance increase rate (%) after high-temperature (45° C.) charge and discharge |
|---|---|
| Example 1 | 2.37 |
| Example 2 | 5.79 |
| Example 3 | 4.25 |
| Example 4 | 6.88 |
| Example 5 | 8.01 |
| Comparative Example 1 | 13.42 |
| Comparative Example 2 | 9.12 |
| Comparative Example 3 | 15.42 |
| Comparative Example 4 | 3.15 |

Referring to Table 2, it may be confirmed that high-temperature resistance increase rates of the lithium secondary batteries prepared in Examples 1 to 5 were lower than those of the lithium secondary batteries prepared in Comparative Examples 1 to 4.

3. Experimental Example 3: High-Temperature (60° C.) Storage Characteristics (Capacity Retention) Measurement After formation was performed on each of the lithium secondary batteries prepared in Examples 1 and 2 and Comparative Examples 1 to 4 at a current of 200 mA (0.1 C rate), gas in the battery was removed (degassing process). After each lithium secondary battery having gas removed therefrom was moved to charge/discharge equipment at room temperature (25° C.), each lithium secondary battery was charged at 0.33 C rate to 4.2 V under a constant current/constant voltage condition, cut-off charged at 0.05 C, and discharged at 0.33 C to 2.5 V. In this case, discharge capacity, after the above charge/discharge were performed three times, respectively, was measured using PNE-0506 charge/discharge equipment (manufacturer: PNE SOLUTION Co., Ltd., 5 V, 6 A), and the discharge capacity in this case was set as initial discharge capacity. Subsequently, each lithium secondary battery was charged at 0.33 C rate to 4.2 V under a constant current/constant voltage condition, cut-off charged at 0.05 C, and then stored at 60° C. for 8 weeks.

Thereafter, after each lithium secondary battery was moved to charge/discharge equipment at room temperature (25° C.), each lithium secondary battery was charged at 0.33 C rate to 4.2 V under a constant current/constant voltage condition, cut-off charged at 0.05 C, and discharged at 0.33 C to 2.5 V. Discharge capacity, after the above charge/discharge were performed three times, respectively, was measured using PNE-0506 charge/discharge equipment (manufacturer: PNE SOLUTION Co., Ltd., 5 V, 6 A). The discharge capacity in this case and the initial discharge capacity (100%) were compared to calculate high-temperature capacity retention (%), and the results thereof are presented in Table 3.

TABLE 3

| | Capacity retention after high-temperature (60° C.) storage |
|---|---|
| Example 1 | 91.16 |
| Example 2 | 90.85 |
| Comparative Example 1 | 86.18 |
| Comparative Example 2 | 89.32 |
| Comparative Example 3 | 85.98 |
| Comparative Example 4 | 88.20 |

Referring to Table 3, it may be confirmed that the lithium secondary batteries of Examples 1 and 2 had a higher capacity retention at a high temperature (60° C.) than the lithium secondary batteries of Comparative Examples 1 to 4.

4. Experimental Example 4: High-Temperature (60° C.) Storage Characteristics (Resistance Increase Rate) Measurement After formation was performed on each of the lithium secondary batteries prepared in Examples 1 and 2 and Comparative Examples 1 to 4 at a current of 200 mA (0.1 C rate), gas in the battery was removed (degassing process). After each lithium secondary battery having gas removed therefrom was moved to charge/discharge equipment at room temperature (25° C.), each lithium secondary battery was charged at 0.33 C rate to 4.2 V under a constant current/constant voltage condition, cut-off charged at 0.05 C, and discharged at 0.33 C to 2.5 V. In this case, a SOC (state of charge) was set to 50% based on discharge capacity after the above charge/discharge were performed three times at room temperature (25° C.), respectively. In this case, direct current internal resistance was measured by a voltage drop obtained when each of the lithium secondary batteries was subjected to a discharge pulse at 5 A (2.5 C) for 10 seconds (measured using PNE-0506 charge/discharge equipment (manufacturer: PNE SOLUTION Co., Ltd., 5 V, 6 A)), and the resistance in this case was set as initial resistance.

Thereafter, after each lithium secondary battery was stored at 60° C. for 8 weeks, each lithium secondary battery was moved to charge/discharge equipment at room temperature (25° C.), a SOC (state of charge) was set to 50%, and direct current internal resistance was then measured by a voltage drop obtained when each lithium secondary battery was subjected to a discharge pulse at 5 A (2.5 C) for 10 seconds (measured using PNE-0506 charge/discharge equipment (manufacturer: PNE SOLUTION Co., Ltd., 5 V, 6 A)). This was compared with the initial resistance (0%) to calculate a resistance increase rate (%), and the results thereof are presented in Table 4.

TABLE 4

| | Resistance increase rate (%) after high-temperature (60° C.) storage |
|---|---|
| Example 1 | 0.70 |
| Example 2 | 1.52 |
| Comparative Example 1 | 9.75 |
| Comparative Example 2 | 3.29 |
| Comparative Example 3 | 15.42 |
| Comparative Example 4 | 2.31 |

Referring to Table 4, since resistance increase rates at a high temperature (60° C.) of the lithium secondary batteries of Examples 1 and 2 were lower than those of the lithium secondary batteries of Comparative Examples 1 to 4, it may be confirmed that high-temperature safety of the lithium secondary batteries of Examples 1 and 2 was better.

The invention claimed is:

1. An electrolyte for a lithium secondary battery, the electrolyte consisting of:
   a lithium salt;
   an organic solvent;
   an additive; and
   optionally an additional additive,
   wherein the additive consists of a compound represented by Formula 1h and a compound represented by Formula 2b:

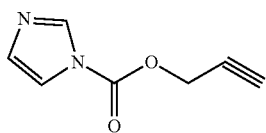

[Formula 1h]

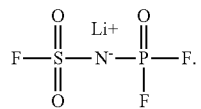

[Formula 2b]

2. The electrolyte for a lithium secondary battery of claim 1, wherein the compound represented by Formula 1h is present in an amount of 0.01 part by weight to 2 parts by weight based on 100 parts by weight of the electrolyte.

3. The electrolyte for a lithium secondary battery of claim 1, wherein the compound represented by Formula 1h and the compound represented by Formula 2b are present in a weight ratio of 2:1 to 2:20.

4. The electrolyte for a lithium secondary battery of claim 1, wherein the compound represented by Formula 1h and the compound represented by Formula 2b are present in a weight ratio of 2:1 to 2:18.

5. A lithium secondary battery, comprising:
   a positive electrode;
   a negative electrode; and
   the electrolyte of claim 1,
   wherein the negative electrode comprises a carbon-based negative electrode active material and a silicon-based negative electrode active material.

* * * * *